(12) United States Patent
Zdeb et al.

(10) Patent No.: US 9,587,688 B2
(45) Date of Patent: Mar. 7, 2017

(54) BRAKE ROTOR RETAINING TOOL

(71) Applicant: Nissan North America, Inc., Franklin, TN (US)

(72) Inventors: David Zdeb, South Lyon, MI (US); Scott Warnecke, Brighton, MI (US); Lakshmi Vaidyanathan, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 253 days.

(21) Appl. No.: 14/184,124

(22) Filed: Feb. 19, 2014

(65) Prior Publication Data

US 2015/0233437 A1   Aug. 20, 2015

(51) Int. Cl.
  *F16D 65/00*   (2006.01)
  *F16B 37/00*   (2006.01)
  *B60T 17/22*   (2006.01)

(52) U.S. Cl.
  CPC ........ *F16D 65/0043* (2013.01); *B60T 17/221* (2013.01); *F16B 37/00* (2013.01)

(58) Field of Classification Search
  CPC . F16D 65/0043; F16B 2037/007; B60B 29/00
  See application file for complete search history.

(56) References Cited

U.S. PATENT DOCUMENTS

| | | | |
|---|---|---|---|
| 4,097,979 A * | 7/1978 | Interdonato | B60B 29/001 29/273 |
| 4,322,195 A | 3/1982 | Rebish et al. | |
| 4,618,300 A * | 10/1986 | Goebel | F16B 37/0864 411/433 |
| 4,625,385 A * | 12/1986 | Kohler | B25B 27/14 29/240 |
| 5,906,418 A * | 5/1999 | Cullen | B60B 11/06 301/35.628 |
| 6,092,968 A * | 7/2000 | Lanham | F16B 23/0061 301/35.623 |
| 6,464,045 B2 | 10/2002 | Weber et al. | |

(Continued)

FOREIGN PATENT DOCUMENTS

DE   19918069 A1   11/2000
WO   0006922   2/2000

OTHER PUBLICATIONS

Drawing of Zinc Plated Spring Steel, McMaster-Carr Supply Company, 2010.

*Primary Examiner* — Bradley King
(74) *Attorney, Agent, or Firm* — Global IP Counselors, LLP (57) ABSTRACT

A brake rotor retaining tool includes a main body having a first end, a second end with a bore extending from the first end and a grip portion. The bore has a non-threaded surface portion and a threaded surface portion. The non-threaded surface portion of the bore extends from the first end of the main body between the first end of the main body to the threaded surface portion. The non-threaded surface portion also has a first overall length measured in an axial direction of the bore. The threaded surface portion of the bore extends from the non-threaded surface portion toward the second end of the main body and has a second overall length measured in the axial direction of the bore. The first overall length is greater than the second overall length.

13 Claims, 7 Drawing Sheets

(56) References Cited

U.S. PATENT DOCUMENTS

| | | | |
|---|---|---|---|
| 6,604,613 B2 | 8/2003 | Burgoon et al. | |
| 8,074,773 B2 | 12/2011 | Brittingham et al. | |
| 8,152,428 B2 | 4/2012 | Rowe et al. | |
| 2002/0157509 A1* | 10/2002 | Turos | B23B 5/02 82/165 |
| 2006/0012240 A1* | 1/2006 | Andersen | B60B 29/00 301/35.629 |
| 2007/0257546 A1* | 11/2007 | Mitchel | B60B 3/02 301/35.627 |
| 2007/0292237 A1* | 12/2007 | Riedel | F16B 23/0061 411/435 |
| 2011/0113608 A1* | 5/2011 | Pulphus | B60B 11/00 29/273 |
| 2012/0070249 A1* | 3/2012 | Meyer | F16B 33/06 411/411 |
| 2012/0280560 A1* | 11/2012 | Tasich | B60B 11/02 301/36.1 |

* cited by examiner

BRAKE ROTOR RETAINING TOOL

BACKGROUND

Field of the Invention

The present invention generally relates to a brake rotor retaining tool. More specifically, the present invention relates to brake rotor retaining tool that temporarily retains a brake rotor during the assembly of a front end of a vehicle.

Background Information

During the process of assembling a vehicle, an axle hub is provided with a plurality of studs that are circumferentially spaced apart from one another. The studs are provided for subsequent attachment of a wheel and corresponding tire to the axle hub. Prior to installation of the wheel and tire, a brake rotor is installed to an axle hub such that the studs extend through corresponding apertures formed in the brake rotor. In many manufacturing arrangements, the rotor remains loose on the axle hub for an extended period of time before installation of the wheel and tire.

Some manufacturer arrangements include installation of a force fitted clip, also, referred to as a push nut, onto one of the studs contacting an outboard surface of the rotor such that the push nut retains the rotor against the hub during subsequent manufacturing steps. However, the push nut can interfere with subsequent installation of the wheel and tire. Further, the push nut is difficult to remove from the stud.

SUMMARY

One object of the present disclosure is to provide a retaining tool that temporarily retains a brake rotor to an axle hub.

Another object of the disclosure is to provide a retaining tool that prevents installation of a wheel to an axle hub with the retaining tool installed to the axle hub.

In view of the state of the known technology, one aspect of the disclosure is to provide a brake rotor retaining tool with a main body having a first end, a second end with a bore extending from the first end and a grip portion. The bore has a non-threaded surface portion and a threaded surface portion. The non-threaded surface portion of the bore extends from the first end of the main body between the first end of the main body to the threaded surface portion. The non-threaded surface portion of the bore has a first overall length measured in an axial direction of the bore. The threaded surface portion of the bore extends from the non-threaded surface portion toward the second end of the main body and has a second overall length measured in the axial direction of the bore. The first overall length is greater than the second overall length.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
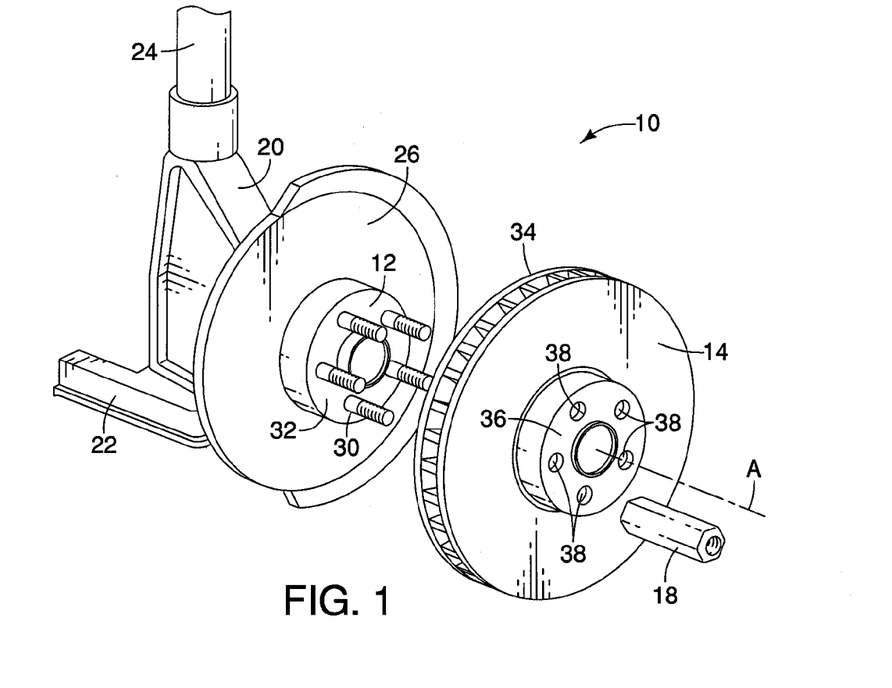
FIG. 1 is an exploded perspective view of a vehicle suspension assembly showing an axle hub and a brake rotor in a process of installing the brake rotor to the axle hub, with a retaining tool that can be installed on a stud of the axle hub in order to temporarily retain the brake rotor to the axle hub in accordance with a first embodiment.

Referring initially to FIG. 1, a portion of a vehicle suspension assembly 10 is illustrated in accordance with a first embodiment. The vehicle suspension assembly 10 shown in FIG. 1 includes an axle hub 12 with a brake rotor 14 in the process of being installed to the axle hub 12. A retaining tool 18 is provided to temporarily retain the brake rotor 14 to the axle hub 12, as described in greater detail below.

In the drawings, the vehicle suspension assembly 10 generically depicted and can be part of a front end suspension assembly or part of a rear end suspension assembly. The vehicle suspension assembly 10 basically includes, among other things, a support member 20, a control arm 22, a strut 24, a backing plate 26, the axle hub 12 and the brake rotor 14.

The support member 20 can be a pivotal steering knuckle (front end) or a support bracket (rear end) that includes a bearing assembly that rotatably supports the axle hub 12. The control arm 22 is typically supported to structural elements of a vehicle (not shown) for limited pivoting movement. A lower end of the support member 20 is attached to the control arm 22 such that the control arm 22 allows the support member 20 to undergo limited vertical movement in a conventional manner. The strut 24 is fixedly attached to an upper end of the support member 20 and includes a damper or shock absorber (not shown). The backing plate 26 is fixedly attached to the support member 20 and includes a central aperture (not shown). The axle hub 12 is connected to bearing assembly (not shown) of the support member 20 and extends through the central aperture (not shown) of the backing plate 26.

The axle hub 12 is rotatable relative to the support member 20 about a central axis A in a conventional manner. The axle hub 12 includes a plurality of studs 30 that are circumferentially spaced apart from one another around the central axis A. Each of the plurality of studs 30 extends in an outboard direction from an outboard surface 32 of the axle hub 12.

Figure 2:
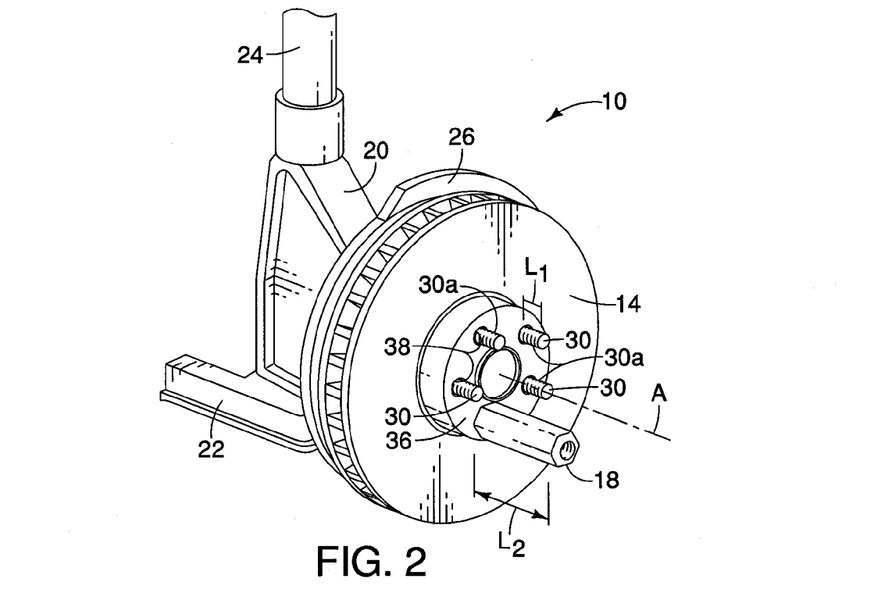
FIG. 2 is a perspective view of the vehicle suspension assembly showing the brake rotor installed to the axle hub and with the retaining tool installed on one of the studs of the axle hub, temporarily retaining the brake rotor to the axle hub in accordance with the first embodiment.
Figure 7:
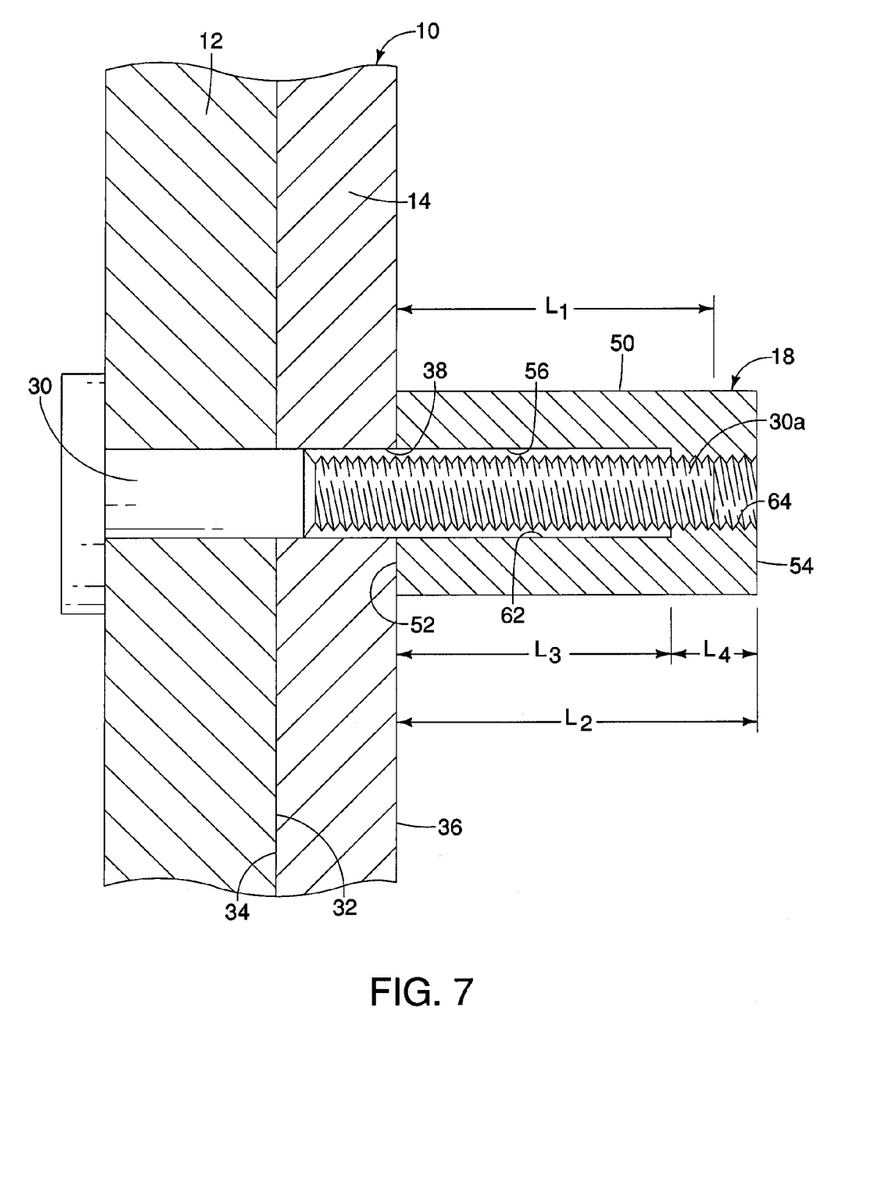
FIG. 7 is a cross-sectional view of the vehicle suspension assembly showing the rotor installed to the axle hub and the retaining tool installed to one of the studs, temporarily retaining the brake rotor to the axle hub in accordance with the first embodiment.

As shown in FIGS. 1 and 7, the brake rotor 14 includes an inboard surface 34 and an outboard surface 36, with a plurality of apertures 38 that extend from the inboard surface 34 to the outboard surface 36. The apertures 38 are circumferentially spaced apart from one another in a manner consistent with the spacing between the studs 30 of the axle hub 12. As shown in FIG. 2, the brake rotor 14 is placed on the axle hub 12 such that the studs 30 extend through corresponding ones of the apertures 38. One or both of the support member 20 and the backing plate 26 includes a caliper supporting structure (not shown) that supports a brake caliper 40, as shown in FIG. 3.

The support member 20, the control arm 22, the strut 24, the backing plate 26, the axle hub 12, the studs 30, the brake rotor 14 and the brake caliper 40, are conventional components of the vehicle suspension assembly 10. Therefore, further description of these conventional components is omitted for the sake of brevity.

Figure 3:
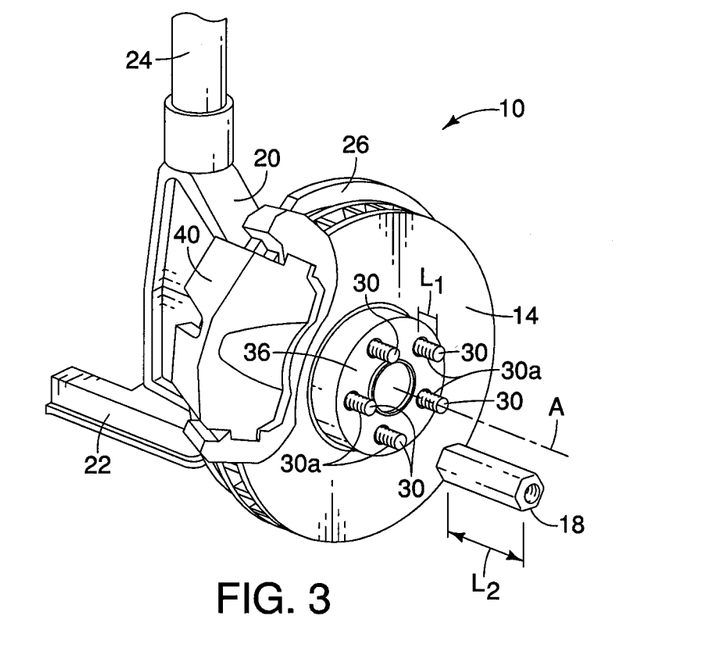
FIG. 3 is another perspective view of the vehicle suspension assembly similar to FIG. 2 showing a brake caliper installed to the vehicle suspension assembly with the retaining tool removed from the stud, readying the vehicle suspension assembly for installation of a wheel and tire in accordance with the first embodiment.

As shown in FIGS. 1, 2 and 3, the retaining tool 18 is used to retain the brake rotor 14 on the axle hub 12 during the assembly process of a vehicle (not shown) and, more specifically, the assembly process of the vehicle suspension assembly 10. Specifically, during the assembly process, the axle hub 12 is installed to the support member 20, as shown in FIG. 1. Thereafter, the brake rotor 14 is placed on the axle hub 12 such that each of the plurality of studs 30 aligns with a corresponding one of the plurality of apertures 38. As the brake rotor 14 is positioned on the axle hub 12, the brake rotor 14 is pushed toward the axle hub 12 with the plurality of studs 30 extending through corresponding ones of the plurality of apertures 38. As shown in FIG. 2, a portion of each of the studs 30 is concealed by the brake rotor 14. However, an exposed threaded portion 30a of each of the plurality of studs 30 extends away from the outboard surface 36 of the brake rotor 14. The exposed threaded portion 30a has an overall length $L_1$ measured along an axial direction of the stud 30, parallel to the central axis A.

As shown in FIG. 2, once the brake rotor 14 is placed on the axle hub 12, the retaining tool 18 is threadedly installed onto one of the plurality of studs 30 and can be hand tightened or wrench tightened onto the stud 30. As the retaining tool 18 is tightened, the inboard surface 34 of the brake rotor 14 is brought into contact with the outboard surface 32 of the axle hub 12, thereby at least temporarily retaining the brake rotor 14 to the axle hub 12.

As shown in FIG. 3, the brake caliper 40 is installed to one or both of the support member 20 and the backing plate 26. Prior to installation of a wheel (not shown), but after installation of the brake caliper 40, the retaining tool 18 is removed, allowing for installation of the wheel (not shown).

As is well known in the art, in most vehicles, the backing plate 26 of the vehicle suspension assembly 10 is located in close proximity to the brake rotor 14 with the brake rotor 14 installed to the axle hub 12. Once the wheel (not shown) is installed to the vehicle suspension assembly 10, and more specifically, to the studs 30 of the axle hub 12, the brake rotor 14 rotates with the axle hub 12. Further, the installation of the wheel forces the brake rotor 14 to remain in fixed contact with the axle hub 12. Therefore, there is little possibility of the brake rotor 14 contacting the backing plate 26. However, during the assembly process, prior to installation of the wheel and the brake caliper 40, the brake rotor 14 is merely placed on the axle hub 12 and can undergo some movement relative to the axle hub 12. Furthermore, the exposed backing plate 26 may become deformed while transporting the vehicle suspension assembly 10 prior to installation of the brake caliper 40 and the wheel. Consequently, in the absence of the wheel and in the absence of the retaining tool 18, it is possible for the brake rotor 14 to contact the backing plate 26. The backing plate 26 can be made with a structurally supportive thickness. However, in most applications, the backing plate 26 is relatively thin and is included mainly to protect surfaces of the brake rotor 14 from becoming coated with contaminants and road related debris. In configuration where the backing plate 26 is a relatively thin metallic member, it is advantageous to avoid contact between the brake rotor 14 and the backing plate 26. Use of the retaining tool 18 prevents contact between the brake rotor 14 and the backing plate 26 during the assembly process.

A description of the retaining tool 18 is now provided with specific reference to FIGS. 4-7. The retaining tool 18 basically includes a main body 50 having a first end 52, a second end 54 with a bore 56 extending from the first end 52 toward the second end 54. As shown, the bore 56 can extend all the way to the second end 54 such that the second end 54 is open. Alternatively, the bore 56 can terminate proximate to the second end 54 such that the second end 54 is closed.

The main body 50 has a shape that resembles a cylinder. However, a grip portion 58 is formed on an exterior surface 60 of the main body 50. In the embodiment depicted in FIGS. 4-7, the grip portion 58 is defined by a plurality of flat surfaces forming a polygonal or hexagonal shape, as is shown in FIG. 5. More specifically, the grip portion 58 is configured and shaped such that a socket wrench (not shown) can be slid over the second end 54 and a power tool (not shown) can be used to install and remove the retaining tool 18 from the stud 30. It should be understood that a hand held wrench (not shown) can also be used to tighten and loosen the retaining tool 18. Alternatively, the retaining tool 18 can merely be installed by a technician's hand and manually removed by hand. The main body 50 and the grip portion 58 are formed as a single, unitary, monolithic element. In the first embodiment, the retaining tool 18 is made of metal or a similarly rigid material.

Figure 4:
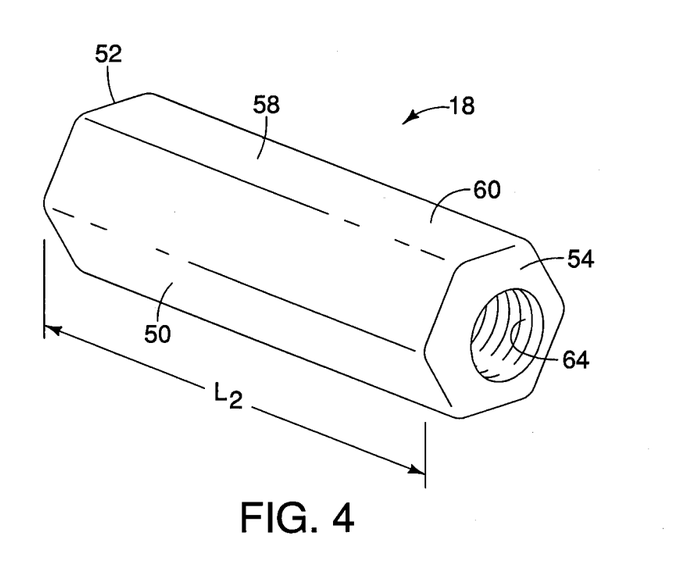
FIG. 4 is a perspective view of the retaining tool having a first end and a second end in accordance with a first embodiment.
Figure 5:
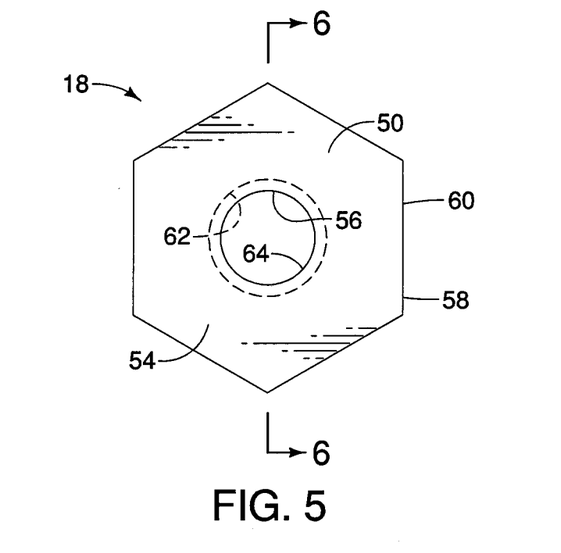
FIG. 5 is an end view of the second end of the retaining tool in accordance with the first embodiment.

As shown in FIGS. 3 and 4, the main body 50 of the retaining tool 18 has an overall length $L_2$. As is also shown in FIGS. 2, 6 and 7, the overall length $L_2$ is greater than the overall length $L_1$ of the exposed threaded portion 30a of the studs 30.

Figure 6:
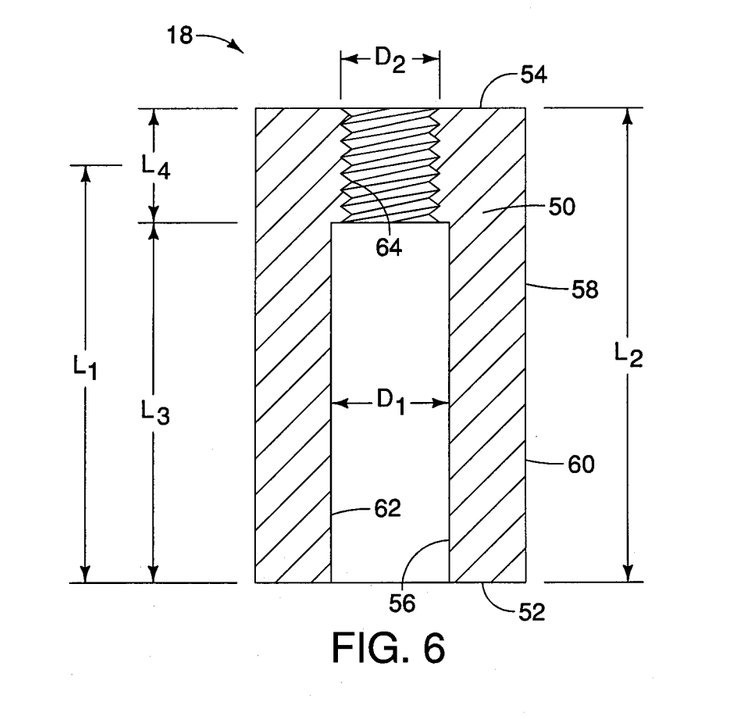
FIG. 6 is a cross-sectional view of the retaining tool taken along the line 6-6 in FIG. 5, showing a non-threaded surface portion and a threaded surface portion in accordance with the first embodiment.

As shown in cross-section in FIG. 6, the bore 56 includes a non-threaded surface portion 62 and a threaded surface portion 64. The non-threaded surface portion 62 of the bore 56 extends from the first end 52 of the main body 50 to the threaded surface portion 64 and has an overall length $L_3$ measured in an axial direction of the bore 56. The threaded surface portion 64 of the bore 56 extends from the non-threaded surface portion 62 toward the second end 54 of the main body 50. The threaded surface portion 64 is an internal threaded portion of the bore 56. The threaded surface portion 64 has an overall length $L_4$ measured in the axial direction of the bore 56. The overall length $L_3$ is greater than the overall length $L_4$ in the depicted embodiment. However, alternatively, the overall length $L_3$ and the overall length $L_4$ can be equal to one another. Further, the overall lengths $L_3$ and $L_4$ when added together are equal to the overall length $L_2$ of the main body 50.

However, it should be understood from the drawings and the description herein that the overall lengths $L_3$ and $L_4$ when added together can be less than the overall length $L_2$ of the main body 50. For example, it is not necessary for the threaded surface portion 64 of the bore 56 to extend all the way to the second end 54 of the main body 50. Further, the non-threaded surface portion 62 of the bore 56 has a first diameter $D_1$ and the threaded surface portion has a second diameter $D_2$ smaller than the first diameter $D_1$.

The overall length $L_1$ of the exposed threaded potions 30a of the studs 30 is superimposed onto FIG. 6. As is shown in FIG. 6, the overall length $L_3$ of the non-threaded surface portion 62 is less than the overall length $L_1$ of the exposed threaded portion 30a of the studs 30. Further, overall length $L_1$ of the exposed threaded portion 30a of the studs is greater than half the overall length $L_3$ of the non-threaded surface 62 of the retaining tool 18.

The inclusion of the non-threaded surface portion 62 of the bore 56 of the retaining tool 18 provides several features. First, when the retaining tool 18 is placed around the exposed threaded portion 30a of the stud 30, initially the retaining tool 18 covers most of the exposed threaded portion 30a of the stud 30 with no threaded engagement between the exposed threaded portion 30a of the stud 30 and the threaded surface portion 64 of the retaining tool 18. This dimensional relationship provides a means for aligning the retaining tool 18 with the stud 30. Thus, the process of threadedly attaching the retaining tool 18 to the stud 30 is made easier. Specifically, since the non-threaded surface portion 62 is more than half the length of the exposed threaded portion 30a of the stud 30, the retaining tool 18 aligns with the stud 30, and the possibility of cross-threading of the exposed threaded portion 30a of the stud 30 and the threaded surface portion 64 of the retaining tool 18 is minimized or eliminated.

Second, the retaining tool 18 can be more quickly installed to the stud 30 and thereafter removed from the stud 30 very quickly, due to only a minimal amount of threaded contact between exposed threaded portion 30a of the stud 30 and threaded surface portion 64 of the retaining tool 18. Specifically, the non-threaded surface portion 62 spaces the threaded surface portion 64 away from the outboard surface 36 of the brake rotor 14. Hence, when the retaining tool 18 is installed to the stud 30, only a small portion of the exposed threaded portion 30a of the stud 30 is able to contact and threadedly engage the threaded surface portion 64 of the retaining tool 18. More specifically, when fully installed to the stud 30, the retaining tool 18 only threadedly engages a small portion of the threads of the exposed threaded portion 30a of the stud 30. In the depicted embodiment, the overall length $L_3$ is dimensioned such that the threaded surface portion 64 of the bore 56 of the retaining tool 18 engages less than 20 percent of all the threads of the exposed threaded portion 30a of the stud 30.

As shown in FIG. 7, when installed to the stud 30, the first end 52 of the retaining tool 18 contacts the outboard surface 36 of the brake rotor 14 such that the inboard surface 34 of the brake rotor 14 is retained against outboard surface 32 of the axle hub 12. Further, the geometry and configuration of the retaining tool 18 is such that the threaded surface portion 64 of the retaining tool 18 is only threadedly engaged with threads at a distal end of the exposed threaded portion 30a of the stud 30. Since the retaining tool 18 only threadedly engages a small portion of the all the threads of the stud 30, the retaining tool 18 is quickly installed and quickly removed. In an assembly process in, for example, a factory or a repair facility, such quick installation and quick removal makes for smoother and more efficient operations.

Second Embodiment

Figure 8:
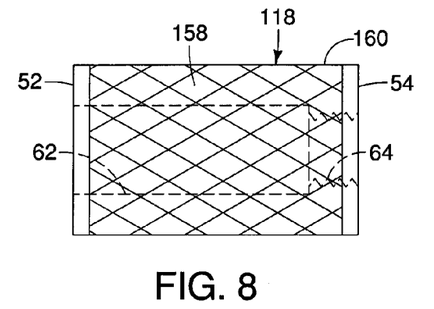
FIG. 8 is a side view of a retaining tool in accordance with a second embodiment.
Figure 9:
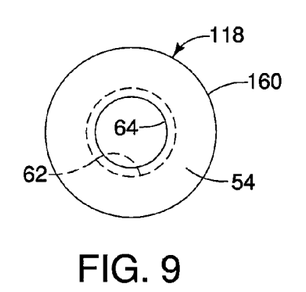
FIG. 9 is an end view of the retaining tool in accordance with the second embodiment.

Referring now to FIGS. 8 and 9, a retaining tool 118 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the exterior surface 160 of the retaining tool 118 is cylindrically shaped. Further, the grip portion 58 of the first embodiment is modified such that a grip portion 158 is defined by a knurled exterior surface of the retaining tool 118. In the second embodiment, the retaining tool 118 is preferably manually used by a technician. The knurled exterior surface that defines the grip portion 158 generates friction when grasped by the human hand, allowing the technician to tighten and loosen the retaining tool 118 with relative ease.

The retaining tool 118 includes a bore that extends from the first end 52 to the second end 54. The bore has the non-threaded surface portion 62 and the threaded surface portion 64. The non-threaded surface portion 62 extends from the first end 52 to the threaded surface portion 64, and the threaded surface portion 64 extends from the second end 54 to the non-threaded surface portion 62 of the bore.

Third Embodiment

Figure 10:
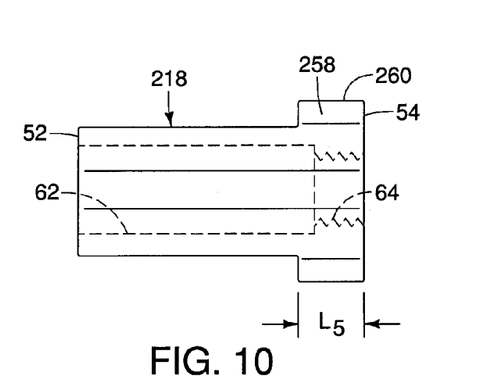
FIG. 10 is a side view of a retaining tool in accordance with a third embodiment.
Figure 11:
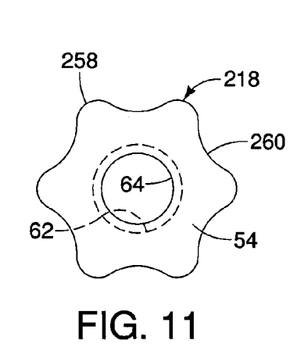
FIG. 11 is an end view of the retaining tool in accordance with the third embodiment.

Referring now to FIGS. 10 and 11, a retaining tool 218 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the exterior surface 260 of the retaining tool 218 can at least partially define a cylindrical shape. However, the grip portion 58 of the first embodiment is modified in the third embodiment such that a grip portion 258 is defined by a plurality of lobes, as shown in FIG. 11. The plurality of lobes that define the grip portion 258 can be located only at the second end 54 of the retaining tool 218, as shown, extending an overall length $L_5$. The overall length $L_5$ of the grip portion 258 can be less than, equal to, or greater than the overall length $L_4$ of the threaded portion 64. Alternatively, the grip portion 258 can extend the entire length $L_2$ of the retaining tool 218. In the third embodiment, the retaining tool 218 is preferably manually used by a technician. The lobes that define the grip portion 258 are easily grasped by the human hand, allowing the technician to tighten and loosen the retaining tool 218 with relative ease.

The retaining tool 218 includes a bore that extends from the first end 52 to the second end 54. The bore has the non-threaded surface portion 62 and the threaded surface portion 64. The non-threaded surface portion 62 extends from the first end 52 to the threaded surface portion 64, and the threaded surface portion 64 extends from the second end 54 to the non-threaded surface portion 62 of the bore.

Fourth Embodiment

Figure 12:
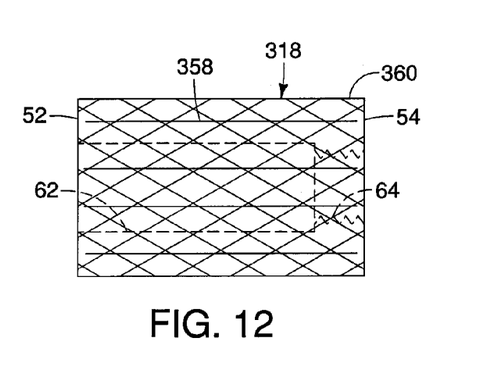
FIG. 12 is a side view of a retaining tool in accordance with a fourth embodiment.
Figure 13:
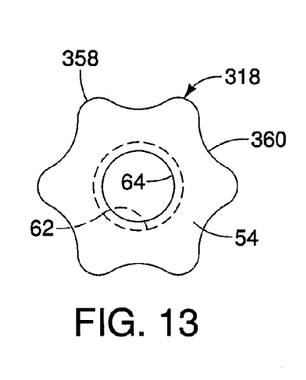
FIG. 13 is an end view of the retaining tool in accordance with the fourth embodiment.

Referring now to FIGS. 12 and 13, a retaining tool 318 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the exterior surface 360 of the retaining tool 318 can at least partially define a cylindrical shape. However, the grip portion 58 of the first embodiment is modified in the fourth embodiment such that a grip portion 358 is defined by a plurality of lobes, as shown in FIG. 13. The plurality of lobes that define the grip portion 358 can be located only at the second end 54 of the retaining tool 318, or alternatively, can extend the entire length of the retaining tool 318, as shown. Further, each of the lobes is provided with a knurled surface. In the fourth embodiment, the retaining tool 318 is preferably manually used by a technician. The lobes define the grip portion 358 and the knurled surface thereof is easily grasped by the human hand and generates friction when grasped, allowing the technician to tighten and loosen the retaining tool 318 with relative ease.

The retaining tool 318 includes a bore that extends from the first end 52 to the second end 54. The bore has the non-threaded surface portion 62 and the threaded surface portion 64. The non-threaded surface portion 62 extends from the first end 52 to the threaded surface portion 64, and the threaded surface portion 64 extends from the second end 54 to the non-threaded surface portion 62 of the bore.

Fifth Embodiment

Figure 14:
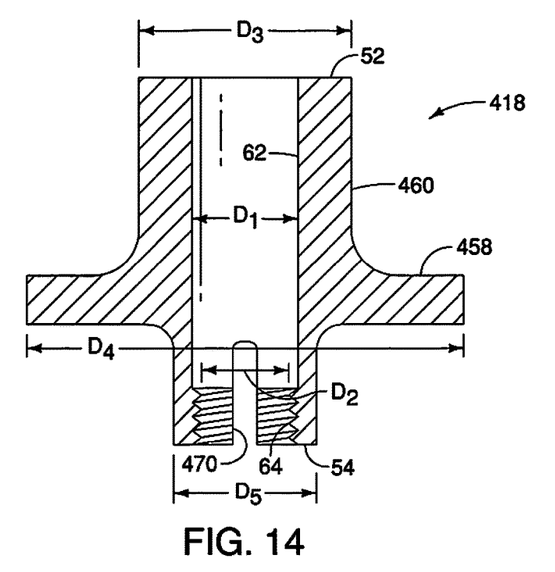
FIG. 14 is a cross-sectional view of a retaining tool in accordance with a fifth embodiment.

Referring now to FIG. 14, a retaining tool 418 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the exterior surface 460 of the retaining tool 418 can at least partially define a cylindrical shape. However, the grip portion 58 of the first embodiment is modified in the fifth embodiment such that a grip portion 458 is defined by a pair of lobes or projections, as shown in FIG. 14. The pair of lobes that define the grip portion 458 are located only proximate the second end 54 of the retaining tool 418. In the fifth embodiment, the retaining tool 418 is preferably manually used by a technician. The pair of lobes define the grip portion 458 are easily grasped by the human hand, allowing the technician to tighten and loosen the retaining tool 418 with relative ease.

The retaining tool 418 includes a bore that extends from the first end 52 to the second end 54. The bore has the non-threaded surface portion 62 that defines a first diameter $D_1$ and the threaded surface portion 64 that defines a second diameter $D_2$ smaller than the first diameter $D_1$ (the first diameter $D_1$ is larger than the second diameter $D_2$). The non-threaded surface portion 62 extends from the first end 52 to the threaded surface portion 64, and the threaded surface portion 64 extends from the second end 54 to the non-threaded surface portion 62 of the bore. The grip portion 458 is spaced apart from the first end 52 and is spaced apart from the second end 54. The first end 52 has an outer surface defining a third diameter $D_3$, the grip portion 458 has an outer most surface portion that defines a fourth diameter $D_4$, and the second end 54 has an outer surface that defines a fifth diameter $D_5$. As shown in FIG. 14, the fourth diameter $D_4$ of the grip portion 458 is larger than each of the third diameter $D_3$ and the fifth diameter $D_5$.

The retaining tool 418 includes slots 470 extending from the second end 54, across the threaded surface portion 64, and along a portion of the non-threaded surface portion 62 to facilitate push installation of the retaining tool 418 onto the studs 30. As a stud 30 progresses through the bore while the retaining tool 418 is pushed toward the outboard surface 36 of the brake rotor 14, the exposed threaded portion 30a comes into contact with threads of the threaded surface portion 64. The slots 470 allow the diameter $D_2$ of the threaded surface portion 64 to expand and contract with the engagement between the threads of the threaded surface portion 64 and the threads of the exposed threaded portion 30a. The threaded surface portion 64 is then permitted to slide onto and engage the exposed threaded portion 30a until the first end 52 of the retaining tool 418 contacts the outboard surface 36 of the brake rotor 14, and the brake rotor 14 is tightly retained against the axle hub 12. Thus, the retaining tool 418 can be easily and speedily installed onto and removed from the stud 30 without having to rotate the retaining tool 418.

In the fifth embodiment, the retaining tool 418 can further be modified such that the respective positions of the threaded surface portion 64 and the non-threaded surface portion 62 within the bore are reversed. Specifically, the threaded surface portion 64 (and the slots 470) can be formed to extend from the first end 52 of the retaining tool 418 toward the non-threaded surface portion 62, and the non-threaded surface portion 62 can be formed to extend from the second end 54 of the retaining tool 418 to the threaded surface portion 64. Installation of the modified retaining tool 418 is essentially the same as described above.

Sixth Embodiment

Figure 15:
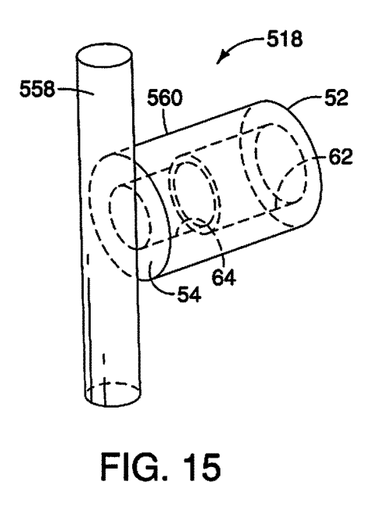
FIG. 15 is a perspective view of a retaining tool in accordance with a sixth embodiment.
Figure 16:
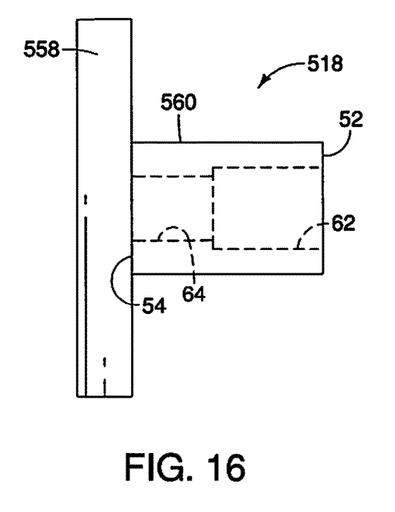
FIG. 16 is a side view of the retaining tool in accordance with the sixth embodiment.

Referring now to FIGS. 15 and 16, a retaining tool 518 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the exterior surface 560 of the retaining tool 518 has a cylindrical shape. However, the grip portion 58 of the first embodiment is modified in the sixth embodiment such that a grip portion 558 is defined by a pair of projections, as shown in FIGS. 15 and 16. The pair of projections, or rod as shown, that define the grip portion 558 are fixedly attached to the second end 54 of the retaining tool 518 by, for example, welding. In the sixth embodiment, the retaining tool 518 is preferably manually used by a technician. The pair of projections that define the grip portion 558 are easily grasped by the human hand, allowing the technician to tighten and loosen the retaining tool 518 with relative ease.

The retaining tool 518 includes a bore that extends from the first end 52 toward the second end 54. The bore has the non-threaded surface portion 62 and the threaded surface portion 64. The non-threaded surface portion 62 extends from the first end 52 to the threaded surface portion 64, and the threaded surface portion 64 extends from proximate the second end 54 to the non-threaded surface portion 62 of the bore. As shown in FIGS. 15 and 16, the second end 54 is closed such that the bore is only open to the first end 52.

Seventh Embodiment

Figure 17:
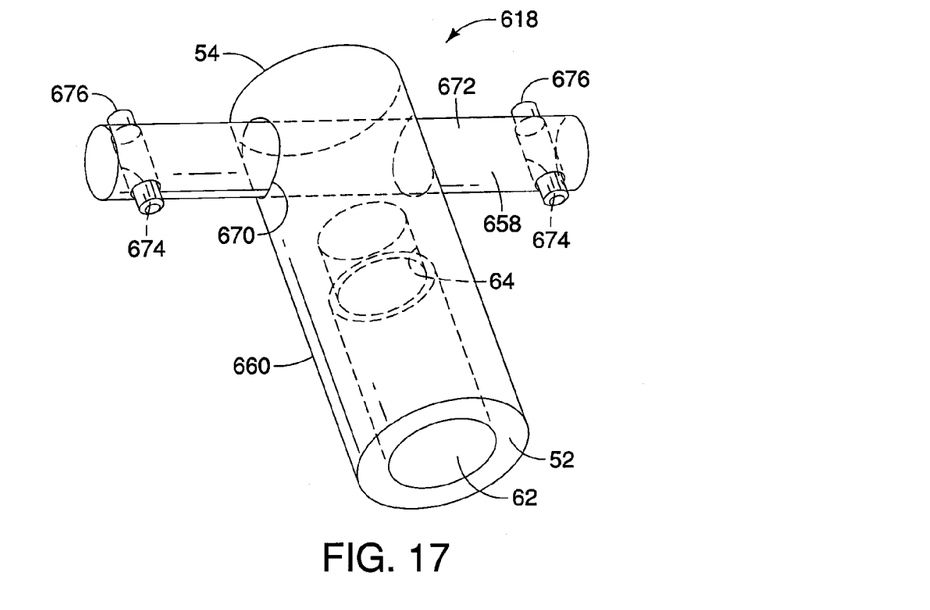
FIG. 17 is a perspective view of a retaining tool in accordance with a seventh embodiment.
Figure 18:
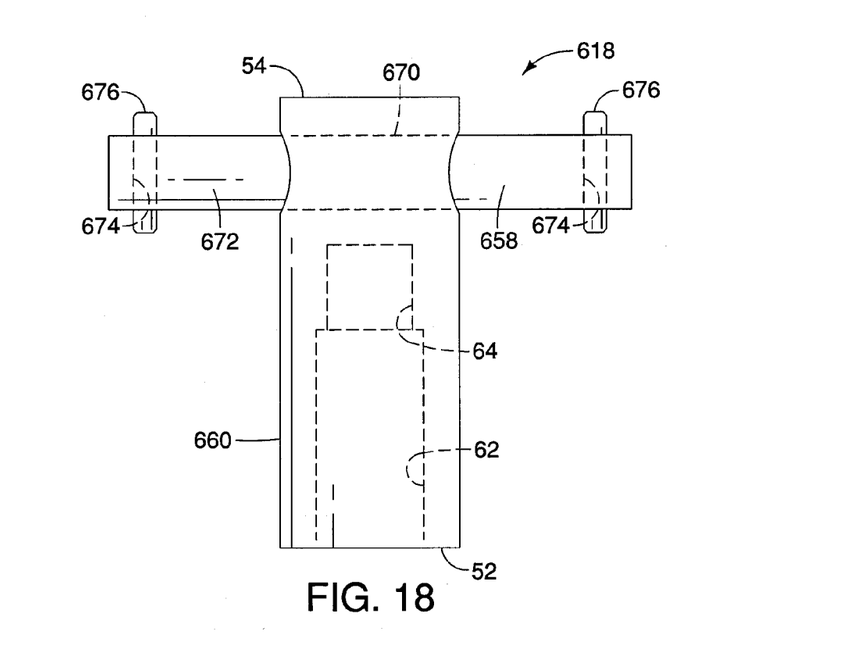
FIG. 18 is a side view of the retaining tool in accordance with the seventh embodiment.

Referring now to FIGS. 17 and 18, a retaining tool 618 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the exterior surface 660 of the retaining tool 618 has a cylindrical shape. However, the grip portion 58 of the first embodiment is modified in the seventh embodiment such that a grip portion 658 is defined by a rod 672 that extends through an aperture 670 drilled into the retaining tool 618, perpendicular to the bore of the retaining tool 618, as shown in FIGS. 17 and 18. The rod that defines the grip portion 658 is slidably retained in the aperture 670 proximate the second end 54 of the retaining tool 618. The rod 672 of the grip portion 658 includes apertures 674 into which pins 676 are installed for limiting the movement of the rod 672 through the aperture 670, so that the rod 672 remains installed in the aperture 670. The pins 676 may be fixedly attached, by welding for example, or can engage the apertures 674 via a friction fit or threaded engagement. The rod 672 can slide through the aperture 670 to expose more length on one side or the other of the retaining tool 618 to provide leverage to facilitate installation of the retaining tool 618 onto the stud 30. In the seventh embodiment, the retaining tool 618 is preferably manually used by a technician. The rod that defines the grip portion 658 is easily grasped by the human hand, allowing the technician to tighten and loosen the retaining tool 518 with relative ease.

The retaining tool 618 includes a bore that extends from the first end 52 toward the second end 54. The bore has the non-threaded surface portion 62 and the threaded surface portion 64. The non-threaded surface portion 62 extends from the first end 52 to the threaded surface portion 64, and the threaded surface portion 64 extends from proximate the second end 54 to the non-threaded surface portion 62 of the bore. As shown in FIGS. 15 and 16, the second end 54 is closed, such that the bore is only open to the first end 52.

In each of the above described embodiments, the retaining tools 18, 118, 218, 318, 418, 518 and 618, are all longer than each of the studs 30 that are subsequently used to retain the wheel of a tire to a vehicle. Since the retaining tools are longer than the axle hub studs, it is difficult, if not impossible, to accidently install the wheel of the tire to the axle hub while the retaining tool is retaining the brake rotor to the axle hub. During vehicle manufacturing processes using a conventional push washer or push nut, because the push washer is so small and thin, it is easily overlooked. The wheel can be easily inadvertently installed to the studs of the axle hub. However, using the retaining tool described above, the vehicle assembly process improved in that it is virtually impossible to inadvertently install the wheel of the tire onto the axle hub with the retaining tool left on one of the studs.

The various features of the vehicle suspension assembly and corresponding vehicle (not shown) are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the brake rotor retaining tool. Accordingly, these terms, as utilized to describe the present invention should be interpreted relative to a vehicle equipped with the brake rotor retaining tool.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A brake rotor retaining tool comprising:
a main body having a first end, a second end with a bore extending from the first end and a grip portion,
the bore having a non-threaded surface portion defining a first diameter and a threaded surface portion defining a second diameter, the non-threaded surface portion of the bore extending from the first end of the main body between the first end of the main body to the threaded surface portion and having a first overall length measured in an axial direction of the bore, the threaded surface portion of the bore extending from the non-threaded surface portion toward the second end of the main body and having a second overall length measured in the axial direction of the bore, the first overall length being greater than the second overall length,
the first end having an outer surface defining a third diameter,
the grip portion being spaced apart from the first end and being spaced apart from the second end, the grip portion having an outer most surface portion that defines a fourth diameter,
the second end having an outer surface that defines a fifth diameter, the fourth diameter of the grip portion being larger than each of the third diameter and the fifth diameter.

2. The brake rotor retaining tool according to claim 1, wherein
the main body and the grip portion are formed as a single, unitary, monolithic element.

3. The brake rotor retaining tool according to claim 1, wherein
the threaded surface portion of the bore has a first diameter and the threaded surface portion has a second diameter is smaller than the first diameter.

4. The brake rotor retaining tool according to claim 1, wherein
the grip portion includes a pair of lobes that project radially outward from the outer surface of the main body.

5. The brake rotor retaining tool according to claim 1, wherein
the second end of the main body defines a slot that extends from the outer surface of the second end to the bore extending through a corresponding portion of the threaded surface portion.

6. A vehicle brake rotor retaining arrangement comprising:
an axle hub having at least one stud extending therefrom;
a brake rotor fitted to the axle hub and having an inboard surface facing the axle hub and an outboard surface, with the at least one stud extending through an aperture of the brake rotor with an exposed threaded portion of the at least one stud extending away from the outboard surface of the brake rotor, the exposed threaded portion having a first overall length measured along an axial direction of the at least one stud; and
a brake rotor retaining tool having:
a main body with a first end, a grip portion and a second end with a bore extending from the first end,
the grip portion being formed on an outer surface of the main body spaced apart from the first end, and spaced apart from the second end,
the bore having a non-threaded surface portion and a threaded surface portion, the non-threaded surface defining a first diameter, the threaded surface portion defining a second diameter, the non-threaded surface portion of the bore extending from the first end to the threaded surface portion and having a second overall length measured in an axial direction of the bore, the threaded surface portion of the bore extending from the non-threaded surface portion toward the second end of the main body and having a third overall length measured in the axial direction of the bore,
the first end having an outer surface defining a third diameter,
the grip portion having an outer most surface portion that defines a fourth diameter,
the second end having an outer surface that defines a fifth diameter, the fourth diameter of the grip portion being larger than each of the third diameter and the fifth diameter, and
the brake rotor retaining tool is removably installed to the stud with the first end contacting the outboard surface of the brake rotor such that the inboard surface of the brake rotor is retained against the axle hub, with the second overall length being greater than half of the first overall length and the threaded surface portion is threadedly engaged with threads at a distal end of the stud.

7. The vehicle brake rotor retaining arrangement according to claim 6, wherein
the third overall length is smaller than the first overall length and smaller than the second overall length.

8. The vehicle brake rotor retaining arrangement according to claim 6, wherein
the second overall length is dimensioned such that the threaded surface portion of the bore engages less than 20 percent of all threads formed on the stud.

9. The vehicle brake rotor retaining arrangement according to claim 6, wherein
the main body has a fourth overall length measured from the first end to the second end that is greater than the first overall length.

10. The vehicle brake rotor retaining arrangement according to claim 6, wherein
the second diameter is smaller than the first diameter.

11. The vehicle brake rotor retaining arrangement according to claim 6, wherein
the brake rotor retaining tool further includes a grip portion formed on an outer surface of the main body.

12. The vehicle brake rotor retaining arrangement according to claim 6, wherein
the second end of the main body defines a slot that extends from the outer surface of the second end to the bore extending through a corresponding portion of the threaded surface portion such that the main body can be easily and speedily installed onto and removed from the at least one stud without having to rotate the brake rotor retaining tool.

13. The vehicle brake rotor retaining arrangement according to claim 6, wherein the grip portion includes a pair of lobes that project radially outward from the outer surface of the main body.

* * * * *